United States Patent [19]

Kim et al.

[11] Patent Number: 4,612,180

[45] Date of Patent: * Sep. 16, 1986

[54] METHOD OF PRODUCING CRYSTALLINE AMMONIUM METATUNGSTATE

[75] Inventors: Tai K. Kim, Towanda; Robert P. McClintic, Monroeton; Clarence D. Vanderpool, Towanda, all of Pa.

[73] Assignee: GTE Products Corporation, Stamford, Conn.

[*] Notice: The portion of the term of this patent subsequent to Sep. 16, 2003 has been disclaimed.

[21] Appl. No.: 704,841

[22] Filed: Feb. 25, 1985

[51] Int. Cl.$^4$ .............................................. C01G 41/00
[52] U.S. Cl. ................................................... 423/593
[58] Field of Search ........................................ 423/593

[56] References Cited

U.S. PATENT DOCUMENTS 3,175,881  3/1965  Chiola et al. ..................... 502/200
3,857,929  12/1974  Quatrini et al. ................... 423/593
3,956,474  5/1976  Ritsko ............................... 423/593
4,504,461  3/1985  Carpenter et al. ............... 423/593

Primary Examiner—John Doll
Assistant Examiner—Wayne A. Langel
Attorney, Agent, or Firm—Donald R. Castle

[57] ABSTRACT

A method is disclosed for producing crystalline ammonium metatungstate from ammonium paratungstate. The method involves heating the ammonium paratungstate with microwave radiation, then heating an aqueous slurry of the heated ammonium paratungstate at from about 80° to about 100° C. at relatively constant volume until the pH of the slurry becomes stabilized at from about 5.8 to about 6.8, adjusting the pH of the slurry to from about 4.2 to about 30, digesting the resulting pH adjusted slurry at from about 80° to about 100° C. for from about 2 to about 6 hours to form a solution of ammonium metatungstate, concentrating the resulting solution, separating insolubles from the solution, and crystallizing ammonium metatungstate from the concentrated solution.

6 Claims, No Drawings

METHOD OF PRODUCING CRYSTALLINE AMMONIUM METATUNGSTATE

FIELD OF THE INVENTION

This invention relates to an improved method for producing ammonium metatungstate. More particularly, it relates to a method for producing ammonium metatungstate in crystalline form using ammonium paratungstate as the starting material.

BACKGROUND OF THE INVENTION

Tungsten, generally in the form of tungsten oxide, $WO_3$, is useful as a component of a variety of catalysts for chemical reactions. In most cases in the manufacture of these catalysts it is necessary at some stage to provide a water soluble tungsten compound from which the tungsten oxide is derived. For example, certain types of catalysts comprise porous carriers such as, for example, alumina impregnated with compounds of catalytic elements such as tungsten. In the preparation of such catalysts the carrier materials are immersed, or slurried, in solutions of the compounds of the catalytic elements and then dried, leaving the catalyst compound intimately associated with the carrier. Ammonium metatungstate, $(NH_3)_6H_2W_{12}O_{40}.xH_2O$, is a particularly useful solute in such solutions. It offers the advantage of being readily soluble in water and, in addition, it decomposes readily on heating to leave the desired catalytic residue of tungsten oxide in the carrier. Alkali metal salts of the tungstates are also water soluble, but their use in catalyst manufacture is restricted by the fact that the presence of residual alkali metals frequently is objectionable in catalytic materials.

It has been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatatungstate is produced by such a baking operation. However, therogravimetric studies of this process have demonstrated that the ammonium paratungstate is not converted entirely to ammonium metatungstate at any particular temperature, nor after any particular baking time. To the contrary, other degradation products, particularly insoluble tungsten oxide also are continuously formed during the baking. In addition, certain amounts of unconverted ammonium paratungstate remain. As a result, substantial amounts of insoluble tungsten oxide and also ammonium paratungstate, which is only slightly soluble, remain undissolved when it is attempted to dissolve the product of the baking operation, making it necessary to filter the solution before use, and discard or reprocess the insoluble materials. Also, as indicated above, the small amount of paratungstate remaining in solution may complicate the use of the solution because of its tendency to precipitate out with temperature changes or evaporation of the water.

U.S. Pat. No. 3,591,331 discloses a process for producing ammonium metatungstate without an appreciable formation of ammonium paratungstate. The process comprises contacting an aqueous ammonium tungstate solution having a pH of at least about 9 with an organic extractant solution comprising di-2-ethylhexyl phosphoric acid, and a water insoluble hydrocarbon solvent, the components being in specified ratios to extract ammonium ions from the aqueous solution, separating the resultant aqueous solution from the organic solution, heating the aqueous solution to a temperature of at least about 60° C. for at least about 1 hour and recovering an essentially pure ammonium metatungstate.

U.S. Pat. No. 3,857,928 discloses a process for producing cyrstalline ammonium metatungstate from ammonium tungstate solution by introducing the ammonium tungstate solution into an ion exchange column containing a weak acid (carboxylic group) cation exchange resin, and collecting the effluent from the column until a pH of about 3.5 is reached. The effluent solution is then digested at about 98° C. for about 5 hours, followed by crystallization of ammonium metatungstate by conventional processes, such as, evaporation or spray drying.

U.S. Pat. No. 3,857,929 discloses a process for producing crystalline ammonmium metatungstate from ammonium tungstate solution by introducing a strong acid cation exchange resin containing sulphonic group batchwise into an ammonium tungstate solution until a pH of about 3.5 is reached. The resin is then removed by filtration and the filtered solution is digested at about 98° C. for at least about 5 hours, followed by crystallization of ammonium metatungstate by conventional processes, such as, evaporation or spraying.

U.S. Pat. No. 3,956,474 discloses a process for producing ammonium metatungstate from ammonium tungstate which involves the addition of about 3.6 percent by weight of silica to an ammonium tungstate solution, digestion for at least about 4 hours at a temperature of at least about 98° C. followed by filtration to remove silica from the ammonium metatungstate solution. Typically about 0.4 percent by weight of silica remains after filtering. The resulting ammonium metatungstate solution may be further processed to recover solid ammonium metatungstate, such as by evaporation or spray drying.

U.S. Pat. No. 3,936,362 discloses a process for producing ammonium metatungstate and other species by passing tungstate ions through an anion exchange membrane into an aqueous solution containing ammonium cations under the driving force of an electrical potential for a time sufficient to achieve a pH within the range in which the desired tungsten compound will form.

U.S. Pat. No. 3,175,881 discloses a method for producing crystalline ammonium metatungstate from ammonium paratungstate by heating the ammonium paratungstate to the point at which a slurry containing about 9% by weight of material exhibits a pH of from about 3 to about 5 the heating time being generally from about 4 to about 8 followed by evaporation of the slurry to about one-third of its original volume, filtering the concentrated slurry and then crystallizing ammonium metatungstate. Based on the $WO_3$ contents of the ammonium paratungstate starting material and the ammonium metatungstate produced, the yield is about 78.1%.

A more efficient method of producing crystalline ammonium metatungstate from ammonium paratungstate in higher yields than the above would be desirable.

SUMMARY OF THE INVENTION

In accordance with one aspect of this invention, there is provided a method for producing crystalline ammonium metatungstate from ammonium paratungstate. The method involves first heating the ammonium paratungstate with microwave radiation, then heating an aqueous slurry of the heated ammonium paratungstate at from about 80° C. to from about 100° C. at relatively constant volume until the pH of the slurry becomes stabilized at from about 5.8 to about 6.0, adjusting the pH of the slurry to from about 3 to about 4.2, digesting the resulting pH adjusted slurry at from about 80° C. to about 100° C. for from about 2 hours to about 6 hours to form a solution of ammonium metatungstate, concentrating the resulting solution, separating insolubles from the solution and crystallizating ammonium metatungstate from the concentrated solution.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, crystalline ammonium metatungstate is produced from ammonium paratungstate in high yields.

Commercially available ammonium paratungstate which has the generally accepted formula $(NH_4)_{10}H_2W_{12}O_{41} \cdot xH_2O$ is first heated to drive off ammonia and water vapor. The heating is designed to give a weight loss of from about 1.5% to about 3.5%. In this weight loss range, the production of insolubles in subsequent steps of the operation is at a minimum and the yield of ammonium metatungstate product is relatively high. If the material is overheated an excessive quantity of free tungstic oxide is produced. At least a substantial portion of this may not be dissolved or converted to the soluble metatungstate in the subsequent digestion step. On the other hand insufficient heating can result in a substantial residue of difficultly soluble ammonium paratungstate which can be lost along with the tungstic oxide in the subsequent digestion step or can remain as an undesirable contaminant in the crystalline ammonium metatungstate product.

Heretofore, the method of heating the starting ammonium paratungstate is in a conventional furnace or calciner. With such furnaces the heating times are generally at least about 6 hours at about 150° C. to about 250° C.

By the method of this invention, the starting ammonium paratungstate is heated with microwave radiation as in a microwave oven. With the microwave radiation, the heating times are significantly shorter and the temperatures are generally lower than in conventional heating devices.

For the ammonium paratungstate to be sufficiently heated in a preferred microwave oven, the power is from about 1 to about 1.5 kilowatts with from about 1.2 to about 1.3 killowatts being preferred. A preferred microwave oven is Despatch Model #SMC-1 33H. In accordance with a preferred embodiment of this invention, the power setting of this model is adjusted to give about 163 volts feed to a 2 killowatt tube and the power level is approximately about 1.2 killowatts microwave output. In accordance with this preferred embodiment, the heating times under the above conditions are from about 6 to about 16 minutes with from about 8 to about 12 minutes being preferred for about 100 grams of ammonium paratungstate to give the desired approximate weight loss of 1.5% to about 3.5%. This amount of ammonium paratungstate takes about 4 hours to heat in a conventional oven of comparable size to the microwave oven to give the desired weight loss.

A slurry is then formed of the heated ammonium paratungstate in water, preferably deionized water, with generally from about 20 to about 40 parts by weight of the ammonium paratungstate in from about 80 to about 60 parts by weight of water. Although the method can be carried out with larger proportions of water, obvious inefficiencies are introduced because of the necessity for evaporating the excess water. Slightly smaller quantities of water can also be used but the subsequent digestion step may then not adequately convert any residual paratungstate to the metatungstate, the result being lower yields or contaminated product. Preferably the water is preheated to from about 60° C. to about 80° C. before the heated material is added to it.

When the heated ammonium paratungstate is first added to the water, there can be evolution of some ammonia resulting in fluctuation in pH. When the slurry is heated, preferably at from about 60° C. to about 80° C., the pH is stabilized at from about 5.8 to about 6.0.

In order for the metatungstate structure to form in the subsequent digestion step, the pH must be from about 4.2 to about 3.0, and preferably from about 3.9 to about 3.2. The pH of the stabilized slurry is therefore adjusted to this range. In general, any agent can be used to adjust the pH. According to one aspect of this invention, mineral acids such as nitric acid, sulfuric acid, and hydrochloric acid or organic acids such as acetic, lactic or formic acids can be used. Generally, the mineral acids are added in relatively dilute forms to avoid localized irreversible formation of colloidal tungstic acid which happens when concentrated acid is used. Generally concentrations of about 3 normal are strong enough to drop the pH without an appreciable increase in the volume of the solution and hence a decrease in the concentration of tungsten, and at the same time dilute enough to avoid the formation of tungstic acid.

Another method of adjusting the pH is by introducing a strongly acidic cation exchange resin into the slurry. Use of such a resin is advantageous over addition of a mineral acid because with the resin there is no anionic contamination of the slurry. A strongly acidic cation resin is therefore preferred over a mineral acid when purity is critical. Such a preferred resin is manufactured by Rohm and Haas Company under the name of Amberlite IR-120. A hydrogen ion of the resin is exchanged for a dissolved ammonium ion in the slurry and the pH of the slurry therefore drops. The amount of resin that is added is sufficient to drop the pH to the desired range. If more resin is added than is needed for this purpose, the pH drops below the desired range and the irreversible formation of tungstic acid takes place and the result is loss of yield. Therefore, it is imperative that the proper amount of resin be added. Generally, from about 0.1 to about 0.2 milliequivalents of resin is added per milliequivalent of $WO_3$. The resin can be added batchwise, that is, the proper amount of resin which has been predetermined is added a little at a time slowly preferably with agitation. It is important that the resin be added relatively slowly to prevent the localized irreversible formation of colloidal tungstic acid. The resin is then removed from the resulting pH adjusted slurry by any standard technique such as filtration. The resin can also be introduced into the slurry in a porous container. This method is less time consuming than the batchwise addition method. The openings in the container should be large enough to allow the exchange of hydrogen ions and ammonium ions, but small enough to prevent the resin from escaping into the slurry. The preferred container is a nylon bag.

The container with the resin is allowed to remain in contact with the slurry, the slurry preferably being agitated to allow maximum contact of the sites of the resin with the slurry. The container and resin are then removed from the resulting pH adjusted slurry. If during the course of the pH adjustment, the pH should stabilize above the desired range, a slight amount of resin can be added until the desired pH is attained.

During the course of the pH adjustment, the proper ratio of ammonia to tungsten is being attained so that in the subsequent digestion step the tungstate is converted to the crystalline ammonium metatungstate structure. The generally accepted formula for ammonium metatungstate is $(NH_4)_6H_2W_{12}O_{40} \cdot H_2O$.

In order for the tungstate in the pH adjusted slurry to be converted to the ammonium metatungstate structure, the slurry is digested. In general the digest is carried out at a temperature of at least about 100° C. In general, the digestion is carried out at from about 70° C. to about 100° C., and preferably from about 90° C. about 100° C. for from about 2 hours to about 10 hours, preferably from about 4 hours to about 6 hours.

U.S. Pat. No. 3,175,881, while teaching the formation of ammonium metatungstate by evaporating followed by obtaining crystalline ammonium metatungstate from a solution of heated ammonium paratungstate in water, does not teach the digestion conditions needed for conversion to the ammonium metatungstate structure which results in in high yields of crystalline ammonium metatungstate.

The entire digestion can be carried out at relatively constant volume. More, preferably for economic purposes, about the first 2 to 3 hours of the digestion can be carried out at relatively constant volume while the remaining time that is needed for conversion can be accumulated while the slurry is being concentrated by evaporation so that part of the digestion and evaporation step can be carried out simultaneously. Upon completion of the digestion, a solution of ammonium metatungstate is produced along with a minor amount of insoluble material which can be impurities or insoluble tungsten compounds.

The ammonium metatungstate solution is concentrated by evaporation to a fraction, preferably about one third of its original volume. As was explained previously, the evaporation can be carried out at a point in the digestion so that when the final volume is reached the slurry, (which is in the process of being converted to a solution) will have been subjected to the required digestion conditions of time and temperature for conversion to the ammonium metatungstate structure.

The concentration of the final ammonium metatungstate solution is generally from about 600 to about 800 grams of $WO_3$ per liter.

The insolubles which can be impurities, insoluble tungsten compounds, or residual amounts of spent resin where resin was used to adjust the pH, are then separated from the final concentrate solution by any standard technique such as filtration. The insolubles can be water washed to recover any soluble tungsten and the resulting wash solution used in subsequent operations.

Crystalline ammonium metatungstate can then be recovered from the concentrated solution by any conventional manner such as by further evaporation or by spray drying.

Based on $WO_3$ content of the starting ammonium paratungstate produces, the yield is at least about 93%.

In the case where resin was used to adjust the pH, the resin can be regenerated for reuse by removing the ammonium ions. This is accomplished by contacting the resin with a mineral acid stripping solution. The hydrogen ions of the mineral acid are exchanged for the ammonium ions of the resin. The preferred mineral acid is hydrochloric acid having a concentration of from about 5 to about 10% by weight.

To more fully illustrate this invention, the following non-limiting examples are presented. All parts, portions, and percentages are on a weight basis unless otherwise stated.

EXAMPLE 1

Seven samples of ammonium paratungstate, 100 grams each are heated in a Despatch Model #SMC-1-33H microwave oven for varying lengths of time. After heating, the weight loss is measured. Table 1 summarizes the results.

| MICROWAVE OVEN WEIGHT LOSS OF AMMOMNIUM PARATUNGSTATE VERSUS HEATING TIME | |
| --- | --- |
| Heating Time, Min. | Weight Loss of Ammonium Paratungstate % |
| 4 | 0.54 |
| 6 | 0.88 |
| 8 | 1.48 |
| 10 | 2.84 |
| 12 | 3.52 |
| 14 | 4.24 |
| 16 | 6.49 |

Instead of the microwave oven, a conventional electrically heated oven is used for heating the ammonium paratungstate. About 100 grams of ammonium paratungstate is heated in a Blue "M" oven at about 205° C. for about 4 hours. It resulted in the following weight losses.

| Sample | Weight Loss % |
| --- | --- |
| 1 | 3.31 |
| 2 | 3.17 |
| 3 | 3.31 |
| 4 | 3.63 |

The results show that the use of the microwave oven for heating required approximately 12 minutes versus about 240 minutes for the Blue "M" oven to achieve approximately the same weight loss.

EXAMPLE 2

Various samples of about 100 parts of ammonium paratungstate are heated in a microwave oven for varying lengths of time. The roasted samples are then slurried in about 365 parts of deionized water. The slurries are then heated to about 80° C. to about 100° C. with the volumes being kept relatively constant. The heating of the slurries is continued until the pH is stablized at from about 5.8 to about 6.0. The pH of each slurry is then adjusted to about 3.5 by introducing a nylon bag containing about 0.2 milliequivalents of resin per milliequivalent of $WO_3$, the resin being a strongly acidic cation exchange resin, Amberlite IR 120 made by Rohm and Haas Company.

The slurries are then digested for about 4 hours at about 98° C. at relatively constant volume. After this digestion period, the volume of the slurries is decreased to about one third of their original volumes by boiling. The resulting concentrated slurries are then filtered and the precipitate is washed with about 100 parts of deionized water in order to remove water soluble ammonium metatungstate. The ammonium metatungstate product is then isolated by crystallization from the resulting filtrate. The table below summarizes the heating times versus weight loss of the ammonium paratungstate in heating and percent recovery of ammonium metatungstate in each portion.

| Heating Time Min. | Weight Loss of Ammonium paratungstate % | Conversion to Ammonium Metatungstate |
|---|---|---|
| 8 | 0.57 | 93.39 |
| 15 | 1.54 | 94.40 |
| 20 | 5.89 | 62.47 |
| 30 | 9.20 | 75.46 |

The heating time is significantly reduced with use of the microwave oven. The desired weight loss is attained along with high yields of ammonium metatungstate product.

While there has been shown and described what are at present considered the preferred emodiments of the invention, it will be obvious to those skilled in the art that various changes and modifications may be made therein without departing from the scope of the invention as defined by the appended claims.

What is claimed is:

1. A method for producing crystalline ammonium metatungstate from ammonium paratungstate, said method comprising:

(a) heating said ammonium paratungstate with microwave radiation to form a heated ammonium paratungstate,
   (b) forming a slurry of said heated ammonium paratungstate in water,
   (c) heating said slurry at from about 80° C. to about 100° C. at relatively constant volume until the pH of said slurry becomes stabilized at from about 5.8 to about 6.0,
   (d) adjusting the pH of said stabilized slurry to from about 4.2 to about 3.0,
   (e) digesting the resulting pH adjusted slurry at from about 80° C. to about 100° C. for from about 2 hours to about 6 hours to form a solution of ammonium metatungstate and some insoluble material,
   (f) evaporating said solution to a fraction of its original volume to form a relatively concentrated ammonium metatungstate solution,
   (g) separating said insoluble material from said concentrated ammonium metatungstate solution, and
   (h) crystallizing ammonium metatungstate from said concentrated ammonium metatungstate solution.

2. A method according to claim 1 wherein said ammonium paratungstate is heated in a microwave oven for about 6 to about 16 minutes.

3. A method according to claim 2 wherein said ammonium paratungstate is heated for about 8 to about 12 minutes.

4. A method according to claim 1 wherein the pH of the stabilized slurry is adjusted with a water soluble acid.

5. A method according to claim 1 wherein at least about 95% by weight of tungsten in said ammonium paratungstate is converted to ammonium metatungstate.

6. A method according to claim 1 wherein at least about 93% by weight of tungsten in said ammonium paratungstate is converted to ammonium metatungstate.

* * * * *